United States Patent [19]

Tsujita

[11] Patent Number: 5,548,429
[45] Date of Patent: *Aug. 20, 1996

[54] PROCESS FOR PRODUCING LIQUID CRYSTAL DEVICE WHEREBY CURING THE SEALANT TAKES PLACE AFTER PRE-BAKING THE SUBSTRATES

[75] Inventor: Chikako Tsujita, Atsugi, Japan

[73] Assignee: Canon Kabushiki Kaisha, Tokyo, Japan

[ * ] Notice: The term of this patent shall not extend beyond the expiration date of Pat. No. 5,335,513.

[21] Appl. No.: 260,212

[22] Filed: Jun. 14, 1994

[30] Foreign Application Priority Data

Jun. 14, 1993 [JP] Japan .................................. 5-165970

[51] Int. Cl.⁶ ............................. G02F 1/1339; G02F 1/13
[52] U.S. Cl. .............................. 359/80; 359/62; 359/82
[58] Field of Search ............................ 359/80, 60, 62, 359/98, 82

[56] References Cited

U.S. PATENT DOCUMENTS 5,029,983   7/1991   Sakayori et al. ........................ 359/60
5,233,461   8/1993   Dornan et al. ........................... 359/80

*Primary Examiner*—Anita Pellman Gross
*Assistant Examiner*—Fetsum Abraham
*Attorney, Agent, or Firm*—Fitzpatrick, Cella Harper & Scinto

[57] ABSTRACT

A liquid crystal device is produced through the steps of: providing a pair of glass substrates each having thereon transparent electrodes, applying the substrates to each other with a thermosetting sealant so that the electrodes thereon oppose each other with a prescribed spacing therebetween, and disposing a liquid crystal at the spacing. In the process, prior to the step of applying the substrates, the thermosetting sealant is applied onto a prescribed part of one of the substrates, and the pair of substrates are both pre-baked under an identical condition for pre-baking the thermosetting sealant. As a result, the two substrates constituting the liquid crystal device are caused to have an identical thermal history so that the resultant liquid crystal device is provided with a uniform alignment characteristic free from difference in alignment power between the substrates and a good application accuracy between the substrates.

3 Claims, 2 Drawing Sheets

PROCESS FOR PRODUCING LIQUID CRYSTAL DEVICE WHEREBY CURING THE SEALANT TAKES PLACE AFTER PRE-BAKING THE SUBSTRATES

FIELD OF THE INVENTION AND RELATED ART

The present invention relates to a process for producing a liquid crystal device having a structure including a liquid crystal sandwiched between a pair of oppositely disposed substrates.

A liquid crystal device is generally produced through a process wherein a pair of glass substrates having thereon transparent electrodes are disposed with their transparent electrodes facing each other with a prescribed spacing therebetween and applied to each other with a thermosetting sealant, and then the spacing is filed with a liquid crystal material.

If such a process is applied to production of a large-area liquid crystal device or panel, particularly a chiral smectic liquid crystal device or panel, a certain display abnormality is liable to occur in some cases, thus resulting in a low yield.

SUMMARY OF THE INVENTION

In view of the above-mentioned problem of the prior art, an object of the present invention is to provide a process for producing a liquid crystal device while suppressing the occurrence of a display abnormality leading to a lower production yield even in the case of a large-area liquid crystal device, particularly a chiral smectic liquid crystal device showing a very sensitive alignment characteristic.

Based on an extensive analysis of the product liquid crystal devices and the production process, it has been discovered that a substantial part of the above-mentioned display abnormality is attributable to a difference in thermal history between a pair of substrates sandwiching the liquid crystal according to the conventional production process.

According to the present invention based on the above knowledge, there is provided a process for producing a liquid crystal device, comprising the steps of:

providing a pair of glass substrates each having thereon transparent electrodes, applying the substrates to each other with a thermosetting sealant so that the electrodes thereon oppose each other with a prescribed spacing therebetween, and disposing a liquid crystal at the spacing;

wherein, prior to the step of applying the substrates, the thermosetting sealant is applied onto a prescribed part of one of the substrates, and the pair of substrates are both pre-baked under an identical condition for pre-baking the thermosetting sealant.

These and other objects, features and advantages of the present invention will become more apparent upon a consideration of the following description of the preferred embodiments of the present invention taken in conjunction with the accompanying drawings.

DESCRIPTION OF THE PREFERRED EMBODIMENTS

Figure 1:
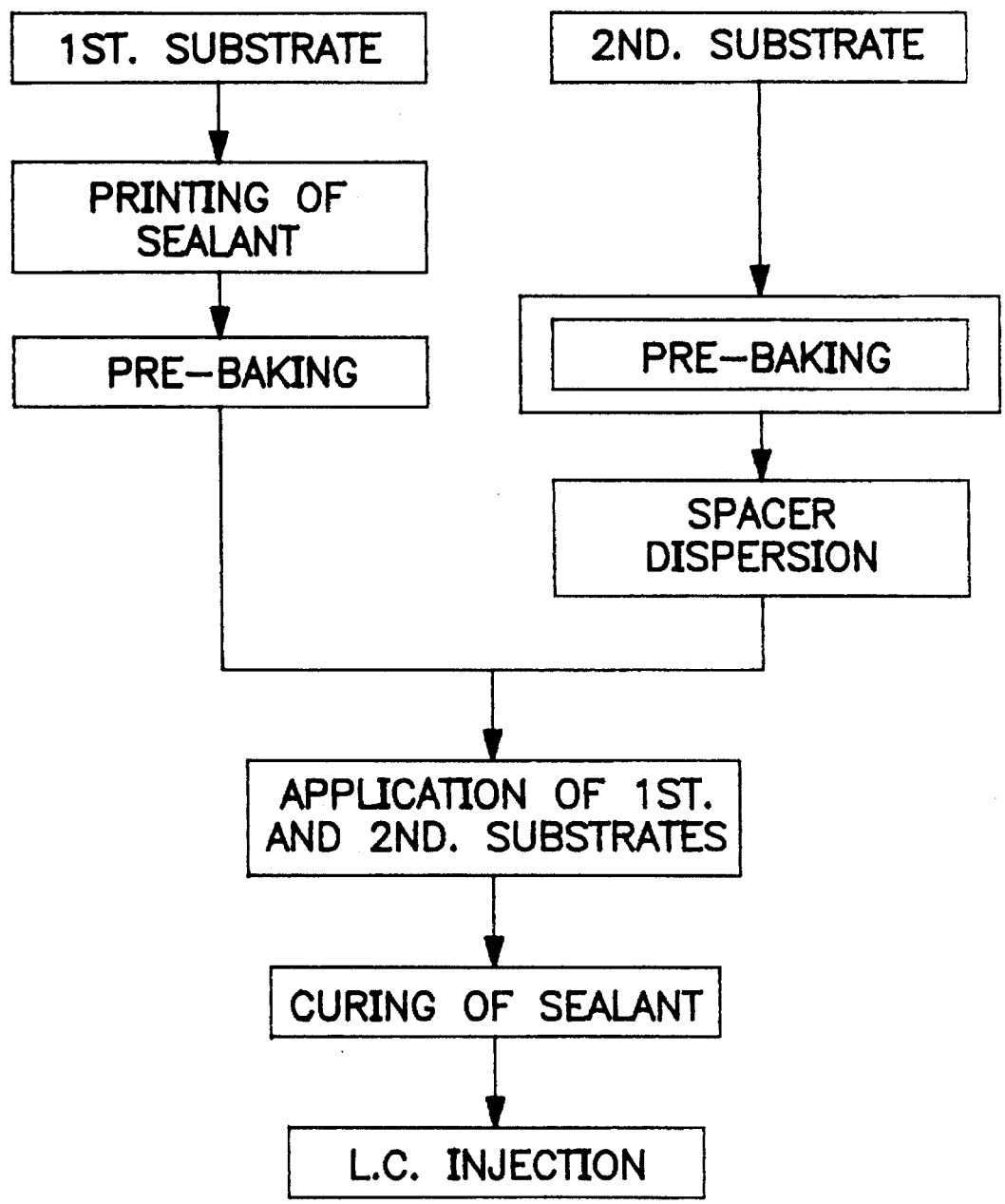
FIG. 1 is a process flow chart adopted in an embodiment of the process for producing a liquid crystal device according to the present invention.

As described above, in the process of the present invention, not only a first substrate having a thermosetting sealant applied thereto but also a second substrate constituting a liquid crystal device in combination with the first substrate but having no thermosetting sealant applied thereto are pre-baked under an identical condition for pre-baking the thermosetting sealant applied onto the first substrate. As a result, the first and second substrates are caused to have a common thermal history. Then, the two substrates are applied to each other with a prescribed spacing therebetween provided by a spacer disposed therebetween and the two substrates are subjected to heating for curing the sealant.

According to the process of the present invention, as described above, two substrates applied to each other to form a liquid crystal device in combination are provided with a common thermal history so that it is possible to obviate a delicate difference in power for aligning a liquid crystal between two substrates having different thermal histories, a difference which is liable to cause a non-uniformity of the liquid crystal alignment. Further, it is possible to apply the two substrates with an improved size accuracy to obviate a possible way, which also adversely affects the uniformity of liquid crystal alignment. This is particularly important in a liquid crystal panel of a large area, i.e., a diagonal size of 15 inches or larger, and a liquid crystal device using a chiral smectic liquid crystal disposed in a small thickness of 4 μm or below and having a subtle alignment characteristic.

Hereinbelow, the present invention will be described more specifically with respect to a preferred embodiment while referring to the drawings.

Figure 2:
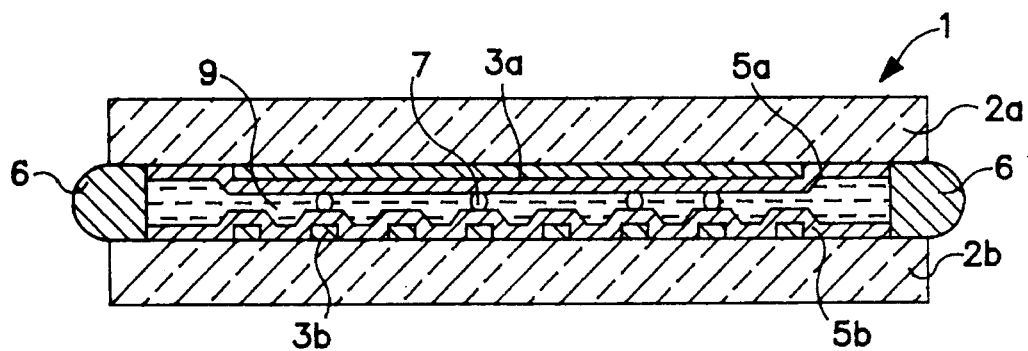
FIG. 2 is a schematic sectional view of a liquid crystal device produced through an embodiment of the process according to the present invention.
Figure 3:
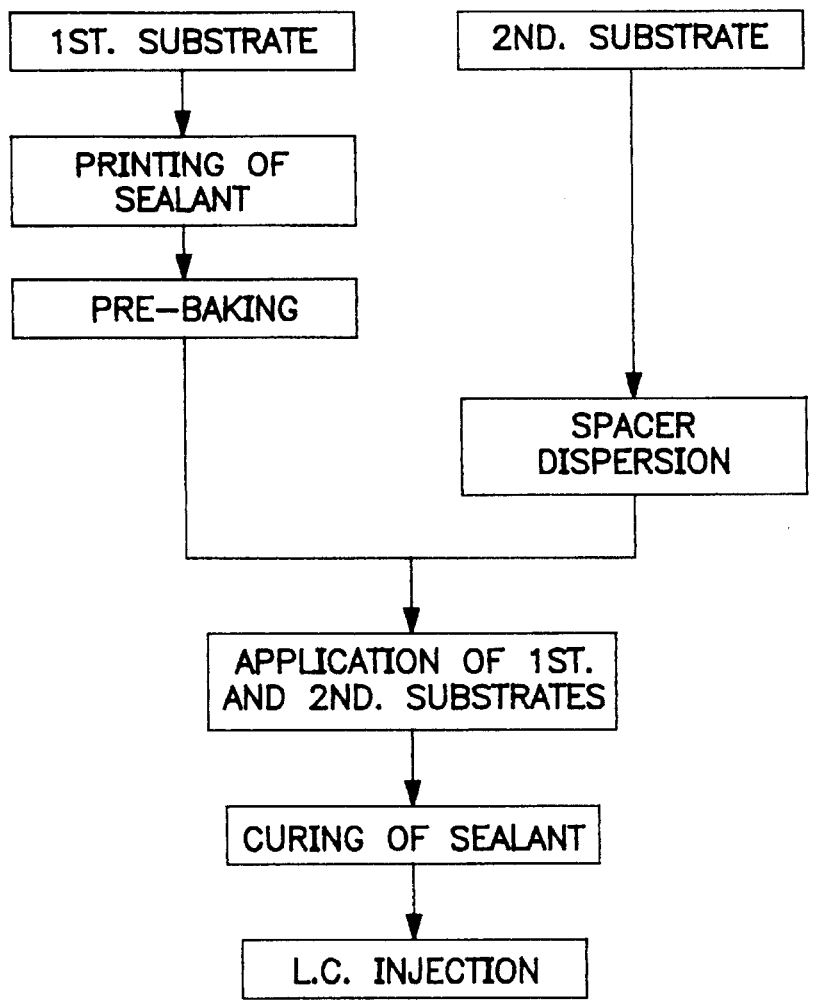
FIG. 3 is a process flow chart adopted in a conventional process for producing a liquid crystal device.

FIG. 2 is a schematic sectional view of a liquid crystal device to be produced according to this embodiment. More specifically, the liquid crystal device 1 includes a pair of transparent substrates 2a and 2b of, e.g., glass, having thereon transparent electrodes 3a and 3b and alignment films 5a and 5b. The substrates 2a and 2b are applied to each other with a sealant 6 and with spacer beads 7 disposed therebetween so as to provide a constant cell gap between the two substrates, and the cell gap is filled with a liquid crystal material 9.

Such a liquid crystal device may for example be produced through the following steps.

Two 1.1 mm-thick glass substrates 2a and 2b are respectively coated with films of ITO by sputtering, which are then patterned into transparent stripe electrodes 3a and 3b having a width of 200–300 μm and formed with a spacing of 10–20 μm. These transparent electrodes 3a and 3b may be further coated with an inorganic insulating film (not shown) in a thickness of 20–200 nm.

The substrates 2a and 2b having thereon the transparent electrodes 3a and 3b are further coated by printing with a polyimide precursor solution, followed by baking, e.g., at 270° C. for 60 min. in the atmospheric environment to form polyimide alignment films 5a and 5b in a thickness of, e.g., 5 nm–100 nm. Alternatively, the alignment films 5a and 5b may comprise polyvinyl alcohol films, polyamide films or SiO films. The alignment films 5a and 5b are further rubbed respectively in one direction so as to align the liquid crystal molecules in the liquid crystal device 1.

Further, at prescribed parts of one (e.g., 2a) of the two substrates 2a and 2b, a sealant 6 is applied and prebaked. In a specific example, an epoxy-type thermosetting sealant ("STRUCT BOND XN-21F" (trade name), available from Mitsui Toatsu Kagaku K. K.) was applied by screen printing to the peripheral parts of one substrate 2a. A number of substrates 2a thus having the sealant applied thereto and a number of substrates 2b having no sealant applied thereto were alternately passed over 10 (stages of) hot plates the temperatures of which could be controlled independently from each, other so that each substrate was pre-baked in a series of 40° C.—5 min.×1 stage, 60° C.—5 min.×1 stage, 90° C.—5 min.×6 stages, 60° C.—5 min.×1 stage and 40° C.—5 min.×1 stage. Then, each pair of the substrates 2a and 2b were applied to each other after dispersing silica spacer beads 7 onto the substrate 2b, and subjected to heat-curing of the sealant 6 at 150° C. for 1 hour to form a blank cell, of which the cell gap of 1.5 μm was filled with a phenylpyrimidine-based chiral smectic liquid crystal to form a liquid crystal device. The thus-produced liquid crystal device having a diagonal size of 21 inches was found to show a good alignment characteristic with no difference in alignment power between the substrates 2a and 2b and to show a good application accuracy between the substrates.

What is claimed is:

1. A process for producing a liquid crystal device, comprising the steps of:

providing a pair of glass substrates including a first and a second substrate each having thereon transparent electrodes, applying a thermosetting sealant onto a prescribed part of the first substrate and pre-baking the first substrate to pre-bake the thermosetting sealant, pre-baking the second substrate under an identical condition as the pre-baking of the first substrate, applying the pre-baked first and second substrates to each other with the pre-baked thermosetting sealant therebetween so that the electrodes thereon oppose each other, curing the thermosetting sealant to form a blank panel, and injecting a liquid crystal into the blank panel to form a liquid crystal device.

2. A process according to claim 1, wherein the pair of substrates are pre-baked substantially simultaneously in a single step after applying the sealant onto said one substrate.

3. A process according to claim 1, wherein said liquid crystal is a chiral smectic liquid crystal.

* * * * *

UNITED STATES PATENT AND TRADEMARK OFFICE
CERTIFICATE OF CORRECTION

PATENT NO. : 5,548,429
DATED : August 20, 1996
INVENTOR(S) : CHIKAKO TSUJITA

It is certified that error appears in the above-identified patent and that said Letters Patent is hereby corrected as shown below:

Title page, insert items [45], [56] & [73]:

[45] DATE OF PATENT

"*Aug. 20, 1996" should read --Aug. 20, 1996--.

[56] REFERENCES CITED
Attorney, Agent or Firm,
"Fitzpatrick, Cella Harper & Scinto" should read
--Fitzpatrick, Cella, Harper & Scinto--.

[73] ASSIGNEE

"[*] Notice: The term of this patent shall not extend
beyond the expiration date of
Pat. No. 5,335,513." should be deleted.

COLUMN 1
Line 19, "filed" should read --filled--.

Signed and Sealed this

Twenty-fourth Day of December, 1996

Attest:

BRUCE LEHMAN

Attesting Officer    Commissioner of Patents and Trademarks